Patented June 22, 1937

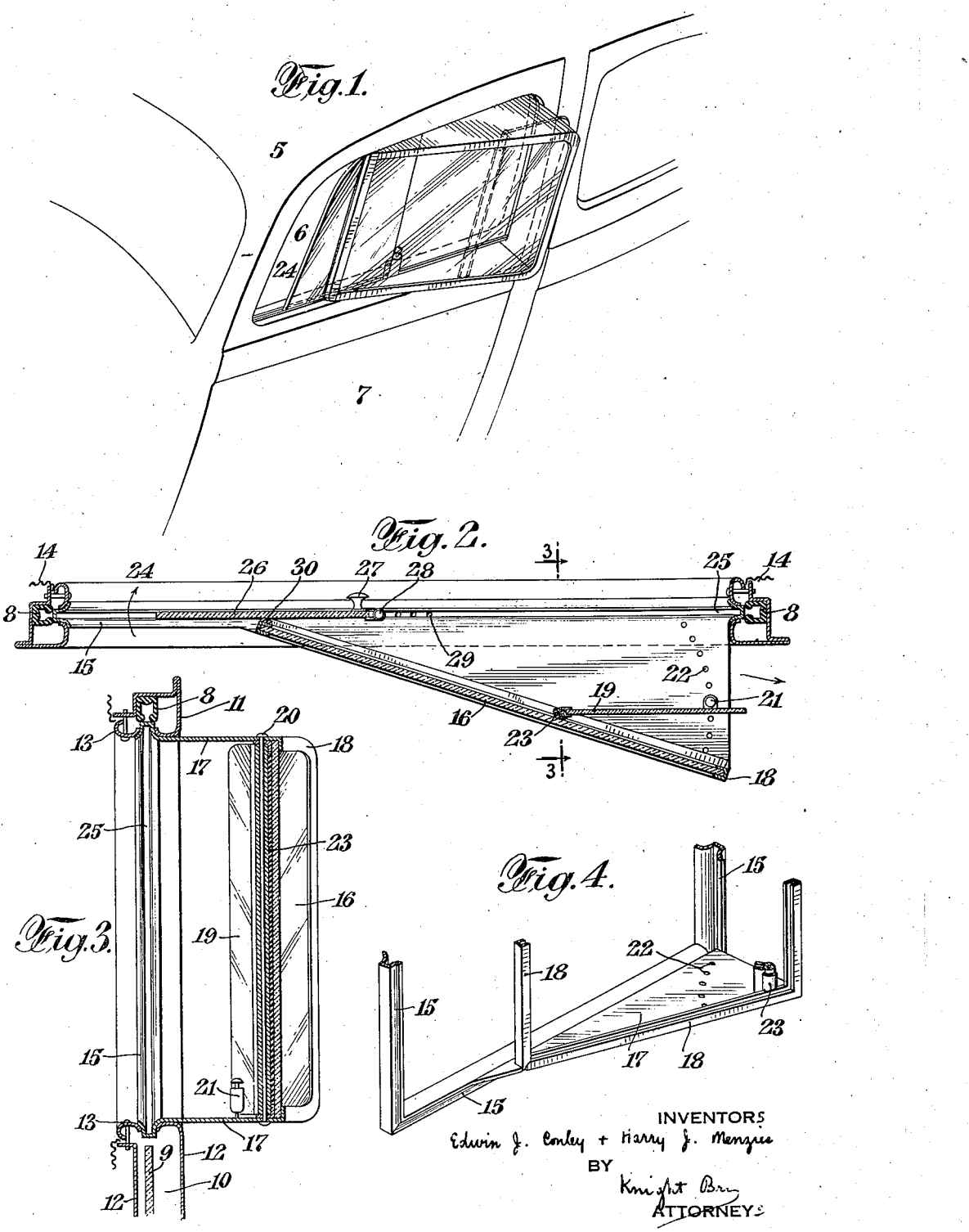

2,084,385

UNITED STATES PATENT OFFICE 2,084,385

VENTILATOR FOR VEHICLES

Edwin J. Conley and Harry J. Menzies,
New York, N. Y.

Application January 14, 1936, Serial No. 59,009

7 Claims. (Cl. 296—44)

While not limited to ventilators for automobiles our invention is more particularly intended for that purpose. Although various methods have been proposed, the method still customarily employed, for regulating the purity and temperature of the air in an automobile, is to open more or less or to completely close one or more of the windows of the automobile and/or its windshield. This method is apt to be drafty and dusty in warm, and close and even poisonous in wet and cold weather. Our invention is intended to enable a gentle and continuous renewal of the air in the car while it is in motion so as to remove, or prevent the accumulation of smoke, gas and dust, and without sensible change of the normal air pressure or the creation of disagreeable currents of air, or increase or lowering of the temperature within the body of the car.

To this end, we provide for the regulable withdrawal of the air from within the body of the car and the regulable admission of outside air, both being governed so that the withdrawal of air may be compensated, under control of the car occupants, by admission of fresh air in such manner as to maintain substantially unchanged the atmospheric conditions within the car body when the car is in motion.

The invention is embodied in a form which permits the entire closing and locking of the ventilating devices so that the interior thereof is not accessible from the outside through the ventilating devices when the car is locked, and extension of the operator's arm at the side of the car for signalling purposes when the ventilating devices are open, is permitted.

The form of the invention herein illustrated and described, is merely illustrative and may be modified in various ways without departing from the principles of the invention as set forth in the claims. The ventilating means shown comprise a frame fitting in a window opening of the car, usually in a door, a hood or housing having its outer vertical surface inclined to the longitudinal axis of the car in such manner that, when the car is in forward motion, the air at the side of the car is deflected outward, and a drop in pressure occurs at the rear of the housing, which is open to allow the air within the car to pass to equalize such pressure drop, and an opening forward of the hood and between it and the front side of the window opening through which outside air may pass to the interior of the car to take the place of the air drawn out through the hood and thus cause a constant replacing of the air within the car by outside air to maintain it constantly at the condition, as to temperature and purity, of the air outside of the car. The width of the air inlet opening forward of the housing is regulable by means of a sliding panel having means of arresting it in positions intermediate its end positions, and the area of the air outlet opening at rear of the housing is preferably also controlled, by means adjustable by the car occupant, to co-act with the air inlet opening in reaching an air-exchange corresponding to the requirements of the moment. These conditions will be affected by the wind and car velocities and direction, the temperature and moisture outside and inside the car, the relative purity and freedom from smoke and dust inside and outside the car, etc.

Other features of the invention will appear in the following specification and will be pointed out in the appended claims.

In the accompanying drawing,

Figure 1 is a perspective view of part of an automobile showing our invention applied to the left hand front door window opening.

Figure 2 is a horizontal sectional view through the door and ventilator, the plane of section being at an intermediate point between the top and bottom of the window opening.

Figure 3 is a vertical section on a plane indicated by the line 3—3, Figure 2, looking in the direction of the arrows.

Figure 4 is a fragmentary perspective view of the lower part of the frame of a ventilator of modified form.

An automobile body is indicated at 5, the parts shown indicating a streamline form now prevalent. The invention is shown applied to the window opening 6 of the left-hand front door 7. A conventional guide and holding member 8 for the top and sides of the vertically sliding glass window 9 is shown, the latter shown in Figure 3 dropped into the usual pocket 10 in the lower part of the door. The window frame 11 is rigid with the inner and outer plates 12 of the lower part of the door, and the molding 13 for holding the edge of the upholstery 14 is secured to the door frame so as to leave between it and the door frame a space, extending all around the window opening which affords a seat for the ventilator frame 15 when it is slipped into place. The molding 13 at one side of the window opening may be loosened for this purpose, or the parts of the door and ventilator frame may be flexible to yield enough to enable the ventilator frame to be slipped in and out. The ventilator frame has, in cross-section an approximately U shape, with outwardly flared sides to facilitate this action. When in position the ventilator frame is closely held by the rounded top and sides of the door frame and molding to avoid rattling. At bottom, dependence may be had on the raising of the glass window 9 to assist in holding the ventilator frame 15 in its seat between the door frame and upholstery molding.

As already indicated, our ventilator comprises an aspirator for withdrawing air from the interior of the car and a valve member for supplying outside air to take the place of that withdrawn and these two members are so associated as to be under the control of the car operator and to best co-operate in producing the effect of constantly removing the air in the car, the rate of interchange being varied as required by the varying conditions, as temperature, wind velocity, direction of movement, car occupancy, etc.

In the form illustrated both exhaust and inlet members are supported on the ventilator frame, the former rearward of the latter, this having been demonstrated to be the arrangement most effective in promoting an interchange of air with the least sensible air current.

The exhaust or aspirator member or hood comprises the, preferably glass, wall or air deflector 16, mounted at an angle to the longitudinal axis of the car to offer an air deflecting surface when the car is in forward movement, the space between the deflector 16 and car window being sealed top and bottom by triangular walls 17, 17, projecting from and attached to or formed integral with the ventilator frame 15. The air deflecting glass plate and the horizontal sealing walls at top and bottom cover the rear part of the window opening and being open at the rear form an air exhausting hood. Thus a drop in air pressure occurs in rear of the hood 16, 17 when the car is in forward motion, causing the air within the car to flow by suction out through the confined rearwardly opening passage between walls 16, 17. The glass deflecting plate is preferably supported at the edges of the horizontal walls 17 by a metallic frame 18, which may be constructed as illustrated in the drawing. The ventilator frame 15, top and bottom sealing members 17, 17, deflector plate 16 and the metallic frame 18 of the deflecting plate form a single rigid unit, not rattling and sealed to allow no interference with the suction of the hood.

To enable the regulation of the air exhaust I preferably employ a valve 19 which when the ventilator is applied to cars of current design, with much curved window corners, may most conveniently be so mounted, as shown in Figure 2, as to swing counterclockwise to close the air exhaust opening, and in designs having more closely rectangular window forms, be mounted as shown in Figure 4 to close by moving in clockwise direction. The valve is pivoted on a hinge-rod 20 mounted in the walls 17 or in other suitable place. It has a preferably spring-pressed manually operated catch 21 engaging a series of holes or notches 22 in the bottom wall 17, so that the width of the exhaust opening may be set and maintained. It also has preferably a soft sealing member 23, of rubber, plush or the like to bear against the inside surface of the deflecting wall 16 in any position.

The aspirator member of our ventilator above described is located in the ventilator frame sufficiently removed from the front of said frame to leave an air passage 24 of sufficient area to allow, when entirely open, passage of air to the interior of the car to suit maximum requirements. This will also result in providing an opening of sufficient dimensions to permit the thrusting out of the arm of the operator for signalling. The relative dimensions of the air inlet opening and the aspirator shown are approximately those which have been found satisfactory in practice. The cross-sectional U form of the ventilator frame provides a support and guideway 25 for a horizontally sliding panel 26, preferably of glass, whose upper and lower edges engage at top and bottom in such guideway in any position to which the panel is adjusted. When in the most forward position, the front edge of the panel engages in the guideway in the front member of the ventilator frame, effectively sealing the air inlet passage. The front edge of the panel is vertical or at an angle to the vertical, and curved or straight to correspond with the marginal line of the opening established by the shape of the window and ventilator frame.

A thumb piece 27 is fixed to the sliding panel 26, and a preferably spring-operated manually controlled latch or bolt 28 may be brought into engagement with any desired hole or socket, of a series 29 of such, to adjust the width of the air inlet opening or lock it in closed position. When both valve 19 and panel 26 are closed and locked, access to the car through the ventilator is effectively prevented and the car doors may be locked in the usual way.

The panel 26 slides horizontally past and close to the inside of the forward end of the deflecting plate 16 and a soft rubber, plush or the like strip 30 is applied to the edge of the deflecting plate 16 adjacent to the panel 26 to seal the ventilator at this point by sliding contact with panel 26 and prevent rattling, by its cushioning effect.

We claim:—

1. A ventilator for the side window of a moving vehicle, having in combination an air deflecting hood opening rearward outside the vehicle and with its forward end substantially in the plane of the vehicle side, and a panel mounted to slide horizontally inside of and in engagement with the said forward end of the hood to close the window forward of the hood or open it for ventilation or signaling.

2. A ventilator for the side window of a moving vehicle, having in combination an air deflecting hood opening rearward outside the vehicle and with its forward end substantially in the plane of the vehicle side, a panel mounted to slide horizontally inside and adjacent to the forward end of the hood, and movable across the window opening forward of the hood to close or open said opening, and manually controlled means for holding the panel in varying positions.

3. A ventilator for the side window of a moving vehicle, having in combination a ventilator frame to engage the edges of a window opening, a hood opening rearwardly outside the vehicle and terminating at its forward end in rear of the front of the window opening, said hood comprising a deflecting plate and sealing walls at top and bottom rigidly uniting the plate to the ventilator frame, and a panel mounted to slide horizontally in the ventilator frame to cover the window opening forward of the hood and inside of and in engagement with the forward edge of the hood.

4. A ventilator for the side window of a moving vehicle, having in combination a ventilator frame to engage the edges of a window opening, a hood opening rearwardly outside the vehicle and terminating at its forward end in rear of the front of the window opening, a panel mounted to slide horizontally in the ventilator frame in engagement with the front edge of the hood, and a sealing and cushioning strip on said edge adjacent the panel.

5. A ventilator for the side window of a moving vehicle, having in combination a ventilator frame to engage the edges of a window opening, a hood opening rearwardly outside the vehicle and terminating at its forward end substantially in the plane of the vehicle side and in rear of the front of the window opening, a panel mounted to slide in the window opening in front of the hood and having means for holding it in varying positions, a valve pivoted within the rear of the hood to control the opening thereof, and manually controlled means for holding the valve in varying positions.

6. A ventilator for the side window of a moving vehicle, comprising in combination a horizontally sliding panel, operating to close or open the forward part of the window to control the admission of air to the vehicle, a ventilator frame having its top and sides of U-shape in cross-section to engage the window frame and hold and guide said panel, and a rearwardly opening deflecting hood covering the window opening in rear of the panel, and terminating forward near the plane of movement of the panel.

7. A ventilator for a vehicle having a window opening in its side, a ventilator frame engaging the edge members of the window opening, and having horizontal guideways, a hood member attached to the rear portion of the ventilator frame, comprising a deflecting plate arranged with its front edge exterior and adjacent to said guideways and upper and lower horizontal members closing the space at top and bottom between the ventilator frame and the deflecting plate, and a panel movably supported in said guideways inside the forward end of said hood and guided in its fore and aft movement in contact with the forward edge of the hood.

EDWIN J. CONLEY.
HARRY J. MENZIES.